United States Patent [19]

Bjorklund

[11] 3,886,974

[45] June 3, 1975

[54] VALVE
[76] Inventor: Curt Arnold Bjorklund, Box 99, Ulricehamn, Sweden
[22] Filed: Feb. 22, 1973
[21] Appl. No.: 334,559

[30] Foreign Application Priority Data
Mar. 3, 1972   Austria .............................. 1826/72
Nov. 27, 1972  Sweden ............................ 15402/72

[52] U.S. Cl. ............................... 137/613; 141/116
[51] Int. Cl. ........................................... F16k 23/00
[58] Field of Search............ 137/614.19, 525, 525.1, 137/525.3, 516.29, 613; 141/115, 116, 117, 119; 222/108, 109, 110

[56] References Cited
UNITED STATES PATENTS
2,741,301  4/1956  Lines .............................. 222/108 X
2,930,414  3/1960  Ring .................................... 141/116
3,062,246  11/1962 Koehler .............................. 141/115
3,731,716  5/1973  Damsh ................................ 141/117

Primary Examiner—Charles J. Myhre
Assistant Examiner—Ira S. Lazarus
Attorney, Agent, or Firm—Fred Philpitt

[57] ABSTRACT

A valve for a fluid flow line comprising a valve housing defining a valve chamber and a valve member in the chamber, the valve member being designed to draw back a limited quantity of fluid upon a drop in pressure at an inlet of the valve.

2 Claims, 2 Drawing Figures

PATENTED JUN 3 1975

3,886,974

VALVE

Many valves available on the market have the disadvantage that they drip after the valve has been turned off. The object of this invention is to provide a valve which will not drip at all or at least much less than prior valves.

Figure 1:
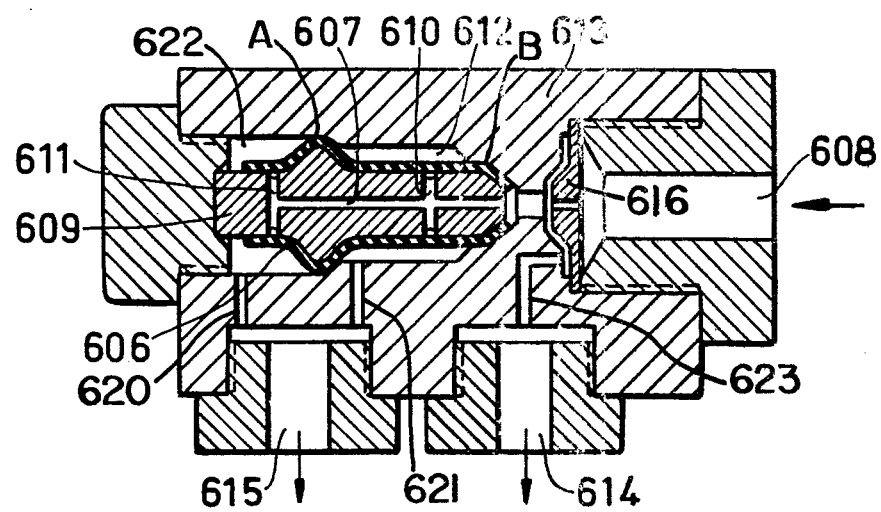
Figure 2:
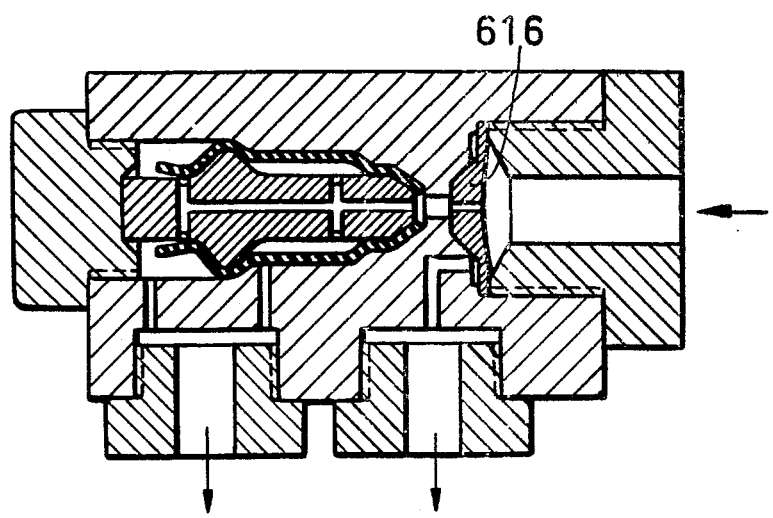

FIGS. 1 and 2 are cross-sectional views illustrating one embodiment of my invention.

A valve housing or valve chamber 613 is seen to contain a body 609 rigidly clamped therein so that the body will not move with respect to the valve housing 613 during normal use. 608 is a fluid inlet and 615 is a fluid outlet that is designed to deliver fluid to any desired place of use, such as a fuel burner. The body 609 is clamped intermediate inlet 608 and outlet 615 and the body 609 is seen to contain an axial passageway 607 that extends through a substantial portion thereof. The body 609 also has passageways 610 and 611 extending radially outwardly from axial passageway 607 at spaced apart points.

The body 609 has a major portion of its sides surrounded by an annular rubber sleeve 606 and it will be seen that this rubber sleeve 606 will normally press against the outer open ends of radial passageways 610 and 611. The rubber sleeve 606 is locked or clamped against longitudinal movement at two annular points A and B on opposite sides of the radial passageway 610. An intermediate space 612 is thus formed between points A and B and between the exterior rubber sleeve 606 and the interior of valve housing 613.

In the body 609 passageway 611 preferably has a smaller diameter than the annular passageway 610. 614 designates a return duct which under non-fluid flow conditions is connected to the inlet 608. The main fluid outlet duct 615 communicates with the chamber 612 thru passageway 621 and with the space 622 by means of passageway 620. 616 designates a disc in the inlet area which is provided with a calibrated hole.

Upon the application of fluid pressure through inlet 608 the disc 616 moves to the left (as shown in FIG. 2) and effects a seal which prevents flow thru 623 and 614, the fluid instead flowing into and along the axial passageway 607. As the passageway 607 fills with fluid a fluid pressure builds there and in the two annular passageways 611 and 610 which will cause the rubber sleeve 606 to stretch outwardly both in the area of the passageway 610 and the area of passageway 611, with the result that the rubber sleeve takes the position indicated in FIG. 2. This permits the fluid introduced into passageway 607 to then flow out through passageway 611, out through passageway 620 and out duct 615 (e.g. to a burner).

However as soon as the fluid pressure in inlet 608 drops under a certain level, the so reduced pressure in passageway 607 will mean that the outwardly stretched rubber sleeve 606 will be able to return (by contraction) to the position shown in FIG. 1. The change of rubber sleeve 606 from the position shown in FIG. 2 to the position shown in FIG. 1 creates a vacuum effect in chamber 612, with the result that any residual liquid which may dribble out of passageway 611 or 606 into duct 615 will be sucked toward and/or into duct 621 and chamber 612. Thus a small amount of liquid will be sucked backwards in out duct 15 and accordingly away from the discharge end of e.g. a burner nozzle. Space 612 thus essentially functions as a vacuum chamber which is activated upon pressure reduction under a certain level of normal fluid flow in such a manner that residual dripping or dribbling is prevented.

Furthermore, the contraction of the rubber sleeve 606 from the position shown in FIG. 2 to that shown in FIG. 1 expels at least part of the liquid in passageway 607 to the right and (since member 616 has returned to the position shown in FIG. 1 on the cessation of fluid flow) such liquid can flow out through return passageway 623, out duct 614 and back to the supply tank.

What is claimed is:

1. A valve device for a fluid line comprising in combination:
   a. a valve chamber,
   b. a fluid inlet to said valve chamber, a fluid outlet from said valve chamber that is spaced away from said fluid inlet, and a fluid flow channel connecting said fluid inlet and fluid outlet,
   c. a variable pressure chamber located intermediate said fluid inlet and fluid outlet resp. associated to said outlet,
   d. an expandable member disposed across said variable pressure chamber, said expandable member being adapted to be moved from one position to another within said fluid pressure chamber in response to fluid force applied to its surface,
   e. a first passageway connecting one side of said expandable member with said fluid flow channel at a point intermediate its ends,
   f. a second passageway connecting the other side of said expandable member with said fluid flow outlet at a point beyond the outlet end of said fluid flow channel,
   g. a resilient disc positioned between said fluid inlet and the beginning of said fluid flow channel, said resilient disc being provided with a centrally located hole, and
   h. a fluid return passageway which starts at a point between the downstream side of said resilient disc and the upstream end of said fluid flow channel, which passageway is cut off from said fluid inlet by said resilient disc under normal fluid flow conditions and open to said fluid flow channel and inlet at pressure conditions below said normal fluid flow pressure conditions.

2. A valve device according to claim 1 wherein said expandable member is a rubber sleeve.

* * * * *